Jan. 28, 1964 C. WYLE ETAL 3,119,487
APPARATUS FOR ORIENTING ARTICLES SUCH AS PLASTIC BOTTLES
Filed Sept. 29, 1961 3 Sheets-Sheet 2

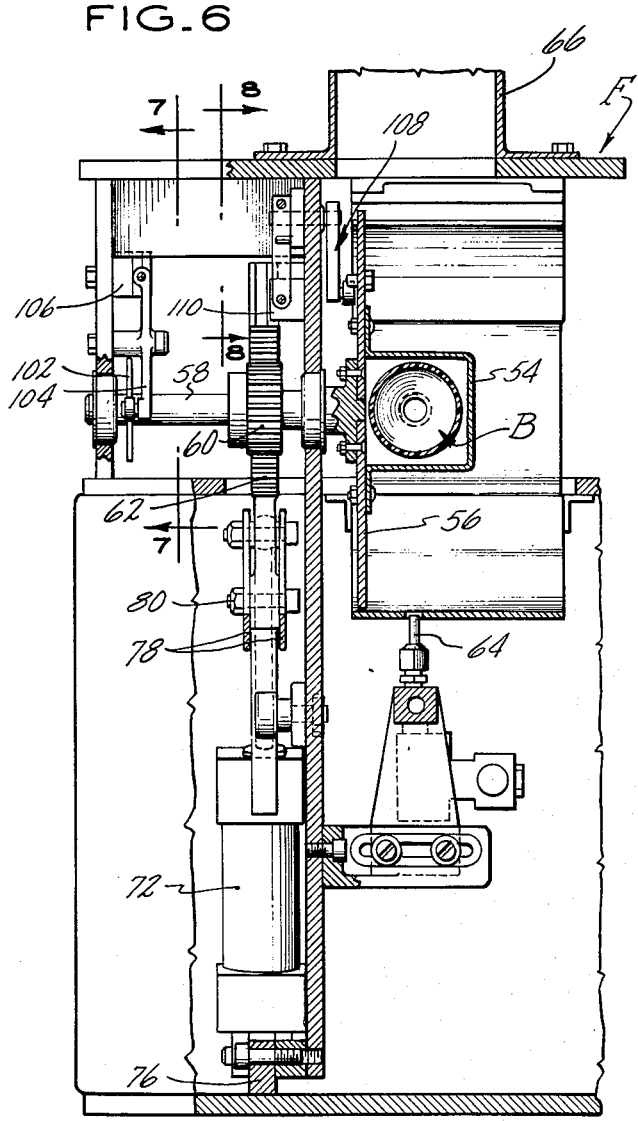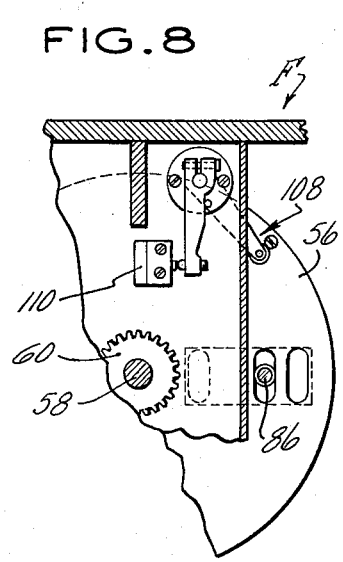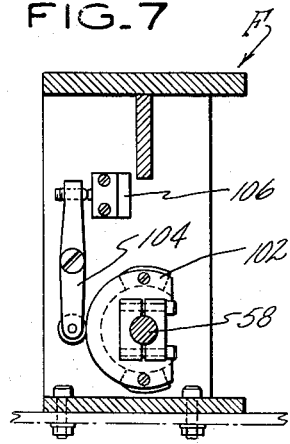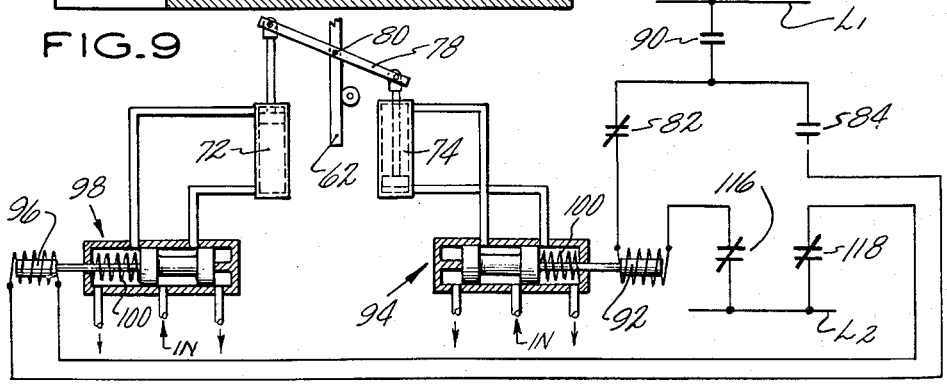

3,119,487
APPARATUS FOR ORIENTING ARTICLES SUCH
AS PLASTIC BOTTLES
Charles Wyle, Bloomfield, Sydney C. White, West Hartford, and Volker R. Grundmann, Windsor, Conn., assignors to Emhart Manufacturing Company, Hartford, Conn., a corporation of Delaware
Filed Sept. 29, 1961, Ser. No. 141,673
7 Claims. (Cl. 198—33)

This invention relates to apparatus for handling articles, such as plastic bottles, and, more particularly, to apparatus for unscrambling such articles from a random group and for conveying them in end-oriented relationship to a remote location.

The apparatus provided in accordance with this invention includes a bin or hopper into which the bottles or other articles are dumped in a random group. The floor of the hopper comprises a disc and a flat cone mounted concentrically thereon for rotation on an axis which is tilted slightly from the vertical. A marginal portion of the disc cooperates with the cone and with the skirt or wall of the hopper to define a track large enough to accommodate the transverse dimension of the bottles but not large enough to accommodate the longitudinal dimension. Thus, many of the bottles are carried on this marginal portion or track in end-to-end relationship, but any such articles not lying on their sides or which are in any way overlapped will be brushed away from the track by a jam preventing disc or discs located over the marginal portion or track.

The articles thus formed in end-to-end relationship are diverted from the hopper into a track or guideway which extends generally tangentially to the hopper. They are picked up in this guideway and moved along by means of an endless belt rotating on vertical axes. The speed of this belt or feeding means is adjusted to provide for relatively slow advance of the articles to a specific point. At that point, the articles are engaged at the opposite sides thereof by a pair of driven high speed rolls or rollers which accelerate the movement of the articles in sequence and thrust the articles in sequence into a tube.

The tube is normally positioned to receive the foremost article and is of such size as to accommodate only the foremost article. However, the tube is pivotally supported for movement through substantially 90° from its normal position in a plane which includes its axis. This pivoting movement can be in either direction within the plane, and when the 90° sweep of movement has been completed, an air ejector directs a blast into the tube to eject or discharge the article from the tube and move it through a delivery chute to the remote location where the bottles or other articles are being used.

A photo-cell discriminating and detecting unit scans each bottle entering the tube and determines when it is fully within the tube prior to pivoting movement of the tube. The bottle is scanned to determine its end orientation within the tube, and the tube is pivoted in one direction or the other depending upon which end of the bottle is forward in the tube. After the bottle is ejected from the tube and passes through a given point in the delivery chute, a photo-cell unit positioned therein controls and effects return movement of the tube to its original or normal position.

It is the general object of the invention to provide apparatus of the aforedescribed type which is substantially foolproof in operation and which is capable of high production operation so as to handle many bottles or other articles in a relatively short time.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 6 is a vertical transverse sectional view through the tube which is pivoted to turn the bottles for end orientation;

FIG. 7 is a detail sectional view taken as indicated by the line 7—7 of FIG. 6;

FIG. 8 is another detail sectional view taken as indicated by the line 8—8 of FIG. 6; and FIG. 9 is a schematic wiring diagram and pneumatic diagram of the means controlling pivoting movement of the end orienting tube.

Figure 1:
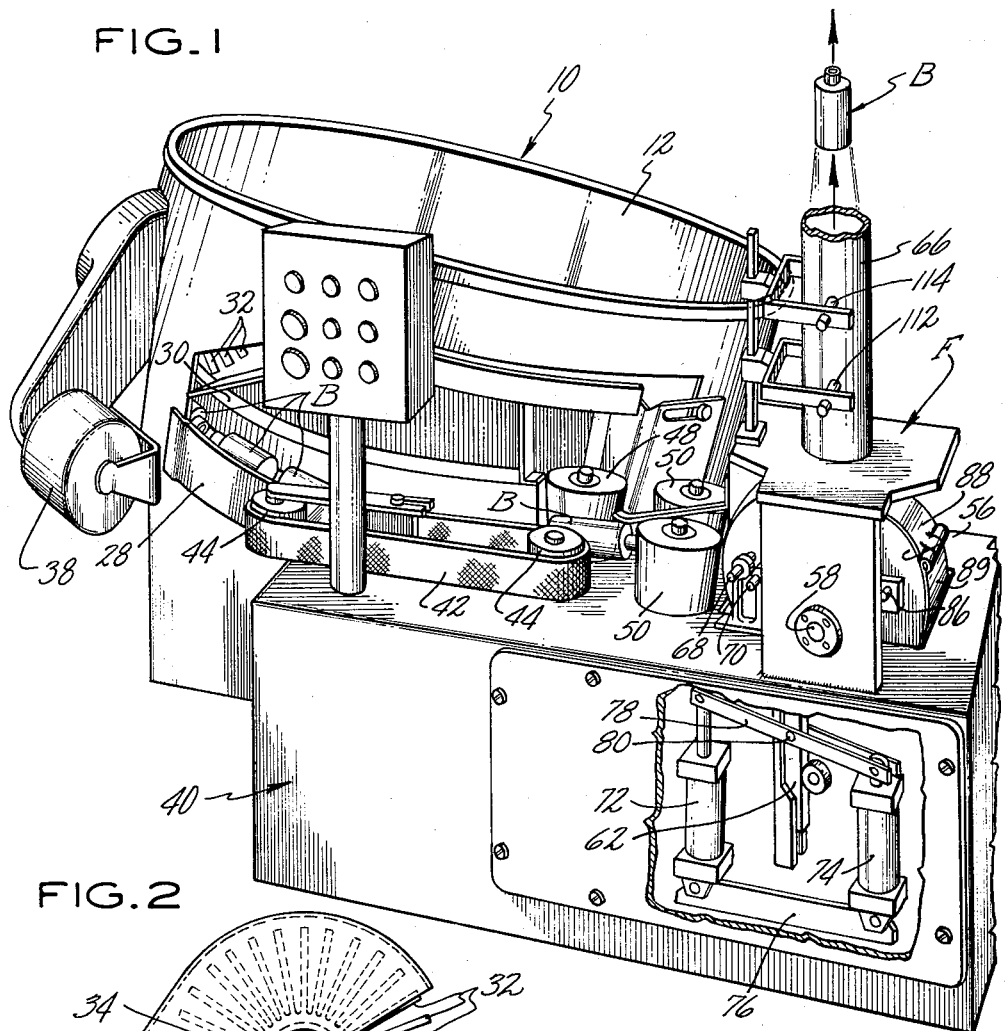
FIG. 1 is a perspective view of the apparatus provided in accordance with the present invention.
Figure 2:
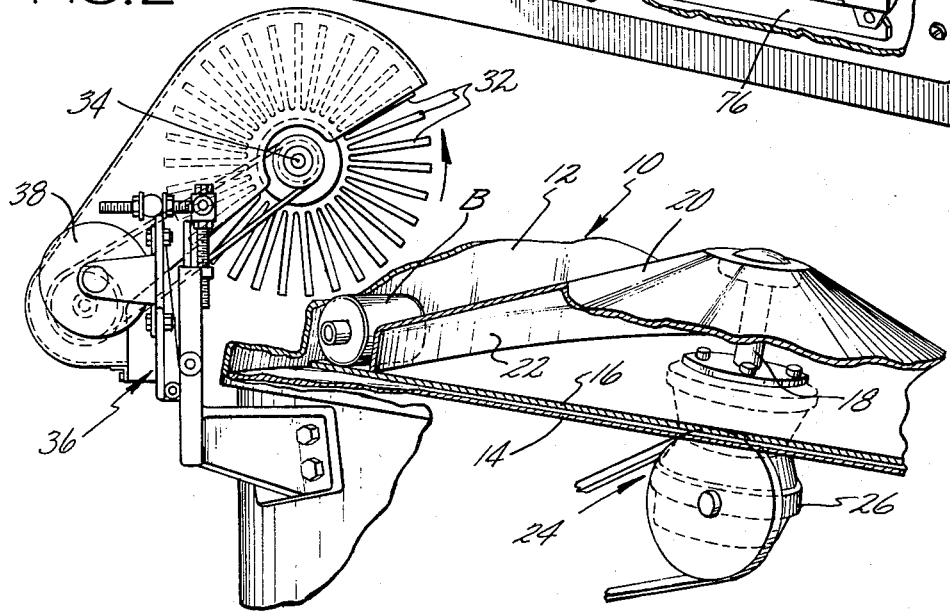
FIG. 2 is a fragmentary perspective view with parts shown in section to reveal some of the detail of the hopper construction used in the apparatus of this invention.

As shown in FIGS. 1 and 2, the apparatus includes a hopper or bin 10 which is open at the top to receive a group of articles, such as the bottle B, B in scrambled or random order. The said hopper includes a side wall or skirt 12 and a bottom wall 14, and it will be observed that the hopper is tilted slightly from the vertical. A preferred angle of tilt is 10°.

A disc 16 (FIG. 2) is mounted on a shaft 18 at the tilted axis of the hopper and so is a relatively flat cone 20. It will be observed that the diameter of the cone 20 is less than the diameter of the disc 16, and it will be noted that the cone has a cylindrical wall or skirt 22 which cooperates with the marginal portion of the disc 16 to carry the bottles B, B around the hopper adjacent to the side wall 12 thereof. The disc 16 and cone 20 are rotated with the shaft 18 by means of a motor (not shown) operating a belt and pulley unit 24 forming a part of a speed reducer 26.

The bottles dumped within the hopper 10 either roll or slide off the cone 20 onto the marginal portion of the disc 16 at the lower part of the tilted hopper. They are carried by the disc and cone around the hopper wall to a point near the top of the inclined bottom wall 14 where they are diverted from the hopper and forced down a generally tangential track outside the hopper and defined by side walls 28 and 30 and by a bottom wall (not shown).

The bottles are diverted from the hopper 10 in end-to-end relationship in a single row, because the marginal portion of the bottom disc 16 in the hopper 10 is not sufficient to permit a bottle to rest thereon in other than end-to-end relationship with adjacent bottles. Further, bottles are prevented from standing or from resting one on top of the other or from having the end of one bottle resting over the end of an adjacent bottle by means of a pair of jam preventing discs 32, 32 which are mounted on a driven shaft 34 over the marginal portion of the hopper disc where the bottles are diverted from the hopper. The shaft 34 is adjustably mounted by a bracket and mounting means 36, and it is driven by means of a motor 38.

It will be noted that the discs 32, 32 have fingers on them which will engage any standing or "double-decked" bottle and brush it aside. Accordingly, only a single row of bottles or other articles is permitted to leave the hopper 10, and the bottles are arranged end-to-end within the row but they are not oriented so that each bottle will advance with the same end first.

Obviously, any use to which the bottles may be put, or any operation involving the bottles, will be facilitated if the bottles can be moved to the position of use or operation in sequence with the same end first. The portion of the apparatus used in orienting the endwise arrangement of the bottles is located within and on a cabinet-like frame 40 which is disposed adjacent the hopper 10.

The outer tangential panel for the bottles removed from the hopper 40 terminates at the top rear edge of the cabinet-like frame 40. At said top rear edge the bottles are engaged and advanced by an endless belt 42 made of foam rubber or the like. The belt engages one side of the bottles and the other side thereof is engaged by the wall 30. The belt 42 is entrained on pulleys 44, 44 which are driven on vertical axes from a drive motor (not shown) within the cabinet 40. A variable or adjustable speed transmission, indicated generally at 46 (FIG. 3), interconnects the said drive motor with the drive pulley 44 so that the speed of the belt and the speed of advance of the bottles can be varied and adjusted to a rate selected. The adjustable speed transmission 46 also rotates a roll or roller 48 which is located oppositely of the belt 42 at the end of the channel wall 30. The speed of the said roller and belt is adjusted to advance the bottles at a relatively slow pace to a point where they can be engaged and thrust ahead by two additional rollers 50, 50.

The rollers 50, 50 are arranged to engage the opposite sides of each bottle in the row and they are driven at a relatively constant high rate of speed by a transmission means 52 driven from the same motor that is used to drive the belt 42 and first mentioned roller 48.

Figure 3:
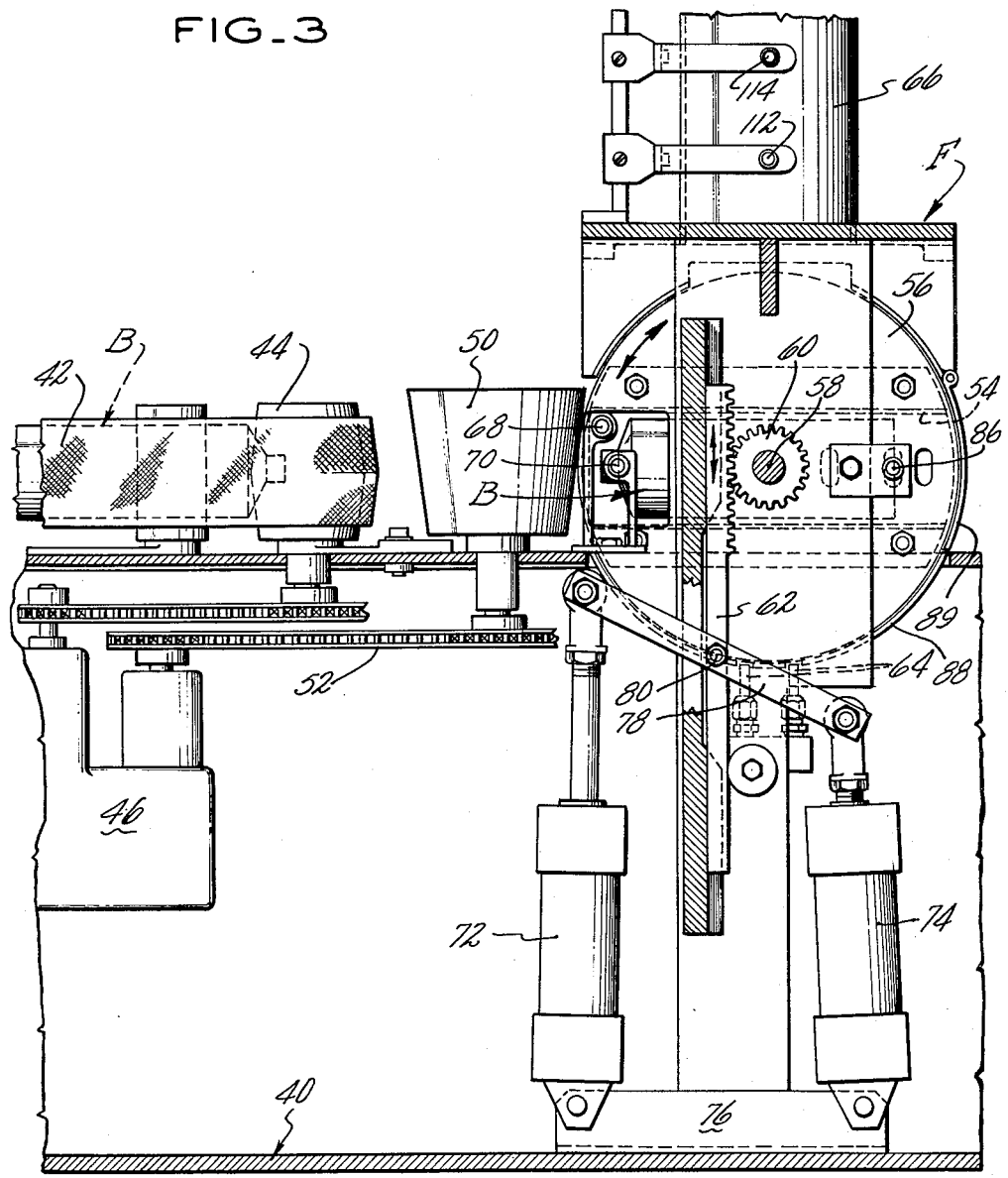
FIG. 3 is a vertical sectional view through the portion of the apparatus wherein the bottles or other articles are turned to achieve endwise orientation at the delivery chute.

The rollers 50, 50 may be referred to as accelerating rollers since they increase the speed of the foremost bottle in the advancing row and thrust it into a tube 54 (FIGS. 3 and 6). Each bottle in the row is accelerated and fed to the tube in sequence, and the movement of the bottle is accelerated by the rollers 50, 50 to provide sufficient time for pivoting of the tube 54 to effect end orientation of the foremost bottle before the next bottle reaches the rollers 50, 50 and is advanced thereby.

As shown in FIGS. 1, 3 and 6, the tube 54 is mounted on a disc 56 for rotation on a horizontal shaft 58. The shaft 58 is rotatably supported in a frame F over the cabinet 40 and a pinion 60 is secured to the said shaft for engagement by a vertially reciprocable rack 62. The tube 54 is normally positioned as shown in FIGS. 3 and 6 with its axis substantially horizontal so as to receive the foremost of the advancing bottles. However, the tube and disc can be pivoted substantially 90° in either direction in a plane which includes the tube axis so that the tube will reside in a substantially vertical position. The means for pivoting the tube 54 and disc 56 includes the pinion 60 and reciprocable rack 62.

When the tube has been pivoted or rotated through 90° to a vertical position, an air blast is directed against the bottle from the bottom of the tube by means of a pair of nozzles 64, 64, the said air blast serving to thrust the bottle upwardly and outwardly of the tube and into a vertical delivery chute 66. The bottles, in most cases, are preferably thrust through the delivery chute 66 neck end first, the air blast being directed against the bottoms of the bottles. This can be effected for each bottle in the row as it reaches the tube 54 by turning the tube 90° in one direction or the other depending upon the end orientation of the bottle as it reaches the chute. It will be understood, however, that in some cases the preference will be to deliver the bottles bottom end first and this can be done.

To achieve this, article scanning and detecting means is incorporated in the construction to control the operation of actuating means which pivots the tube in one direction or the other. The discriminating means includes a pair of light beams and a pair of light sensitive cells 68 and 70.

Figure 4:
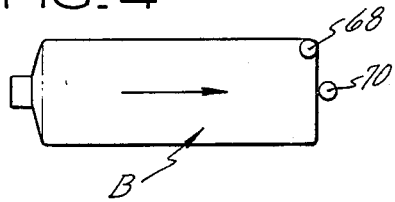
FIG. 4 is a schematic illustration of a bottle being scanned by photo-cell units when the bottle is advancing bottom end first.
Figure 5:
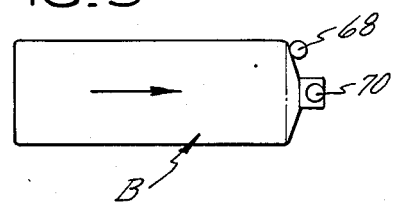
FIG. 5 is a view similar to FIG. 4 but shows the bottle advancing neck end first.

As will be best observed in FIGS. 1, 3, 4 and 5, the photo-cells 68 and 70 are arranged to receive light beamed across the tube 54 when in its normal or horizontal position. Then, when a bottle B is advanced bottom end first into the tube, the beam to the cell 68 will be interrupted prior to interruption of the beam 70. When a bottle is advanced into the tube neck end first as illustrated in FIG. 5, the beam to the cell 70 will be interrupted first and the beam to the cell 68 will be interrupted later. In the one case (FIG. 4 example) the tube 54 will be pivoted 90° clockwise as viewed in FIG. 3, while in the other case (FIG. 5 example), the tube will be pivoted 90° counter-clockwise from its normal position as viewed in FIG. 3. In the one case, that is to pivot the tube clockwise, the rack 62 must be thrust upwardly, while in the other case it must be thrust downwardly.

The actuating means causing reciprocation of the rack 62 and thus pivoting movement of the tube includes a left-hand fluid motor 72 and a right-hand fluid motor 74. The said fluid motors are preferably pneumatic cylinder and piston devices which are pivotally supported on a base 76 at the bottom of the cabinet 40 and having their piston rods connected with the ends of a cross-head or cross-arm 78 which is pivotally connected intermediate its ends at 80 to the rack 62. In the normal position of the tube 54, the piston rod of the fluid motor 72 is thrust outwardly and the piston rod of the right-hand fluid motor 74 is retracted.

Referring now to FIG. 9, when the foremost bottle enters the tube 54 bottom end first to trigger the photo-cells 68 and 70 in that order, no photo-cell actuated relay is operated. However, when a bottle enters the tube 54 neck end first as illustrated in FIG. 5 to trigger the photo-cell units 70 and 68 in that order, a relay (not shown) is actuated in the power circuit of the photo-cell units to open normally closed contacts 82 while closing normally open contacts 84. However, no operation of the actuating cylinders 72 and 74 takes place until the detecting means has been triggered to indicate the presence of an article wholly within the tube 54.

The said detecting means comprises a photo-cell unit 86 which is adjustably supported to receive light beamed across the tube near the forward end thereof. When a bottle or other article is thrust into the tube either end first it may travel the full length of the tube and engage a bounce dampening door 89 on an enclosing skirt or shroud 88, and it will interrupt the light beam near the end of the tube and trigger the photo-cell unit 86. Every time the photo-cell unit 86 is triggered, it operates a relay (not shown) in its circuit to close normally open contacts 90 to complete a power circuit between lead lines L1 and L2 (FIG. 9), the said power circuit including either the contacts 82 or 84.

If the condition of FIG. 4 prevails due to a bottle entering the tube bottom end first, when the photo-cell unit 86 is triggered it completes a circuit with the normally closed switch relay contacts 82 to a solenoid 92 operating a valve 94. The valve 94 is thus shifted from its normal position shown to a position wherein air under pressure is admitted to the bottom of the fluid motor 74 which causes it to thrust its piston outwardly to elevate the rack 62. This, as explained, causes 90° clockwise movement of the tube 54 from the normal position shown in FIG. 3.

Whenever a bottle enters the tube 54 neck end first as shown in FIG. 5, the opposite action takes place. That is, when the photo-cell unit 86 is triggered to close the contacts 90 a circuit is completed with the now closed contacts 84 to the solenoid 96 for a valve 98 controlling the left-hand fluid motor 72. When the solenoid 96 is energized, the valve 98 is positioned to introduce air under pressure at the top of the fluid motor 72 to retract its piston and to thrust the rack 62 downwardly. Whenever either the contacts 82 or 84 are opened in their respective circuits to deenergize the solenoids 92 and 96 respectively, the valves 94 or 98 return to their normal positions by means of springs 100, 100 and this restores the fluid motor 72 or 74 to their normal positions, thus restoring the tube 54 to its normal horizontal position.

Whenever the tube 54 and its shaft 58 are being rotated 90° by means of movement of the rack 62 and pinion 60, a double-face cam 102 (FIG. 7) carried on the shaft 58 rocks a switch actuator 104 to close a limit switch 106 which operates a valve in the pneumatic circuit (not shown) to the blast nozzles 64, 64 opening the said valve for the blast of air.

Further, during such pivoting or rotational movement of the tube 54 and the disc 56 to which it is mounted, actuating means 108 (FIG. 8) is tripped to operate a limit switch 110 to prevent tripping any of the photo-cell units 68, 70 or 86 that might otherwise be caused by rotation of the tube 54 and the disc 56.

When a bottle is ejected from the tube neck end first through the delivery chute 66, it passes a pair of spaced apart photo-cell units 112 and 114. When these photo-cell units are tripped simultaneously, they close a power circuit (not shown) to a relay which thereupon opens normally closed contacts 116 and 118 in the tube actuator circuits of FIG. 9. When the contacts 116 and 118 are opened, both power circuits to the solenoids 92 and 96 are opened so that the valves 94 and 98 will be restored to the normal position shown in FIG. 9 whereupon air under pressure is admitted to the bottom of the fluid motor 72 and to the top of the fluid motor 74. This restores the cross-arm 78 and the rack 62 to their normal positions, thus returning the tube 54 to its normal horizontal position.

The photo-cell units 112 and 114 are used in tandem spaced apart relationship to prevent inadvertent opening of either of the contacts 116 and 118 that might be caused by falling of some very small object such as a tail or other part that may break away from a recently formed bottle. However, if a bottle or other article should fall within the chute and thus trip both of the photo-cell units 112 and 114, switch contact means controlled by the said photo-cell units will be operated to shut off the entire apparatus.

The invention claimed is:

1. Apparatus for sequentially arranging each of a plurality of articles in the same endwise direction at a point in the advance of the articles in an end-to-end row, said apparatus comprising a tube which is normally positioned to receive the foremost advancing article at said point but which is supported for pivotal movement of substantially 90° in either direction from its normal position in a plane which includes its axis, signal producing detecting and scanning means for determining the presence and endwise orientation of an article in said tube, actuating means responsive to signals produced by said detecting and scanning means for pivoting said tube from its normal position in one or the opposite direction depending upon the endwise orientation of the article, means for ejecting the article from the tube in one direction when the tube is pivoted 90° from its normal position, and signal producing means for determining the discharge of an article from the tube and for then operating the actuating means to return the tube to its normal position.

2. Apparatus for sequentially arranging each of a plurality of articles in the same endwise direction at a point in the advance of the articles in an end-to-end row, said apparatus comprising a tube which is normally positioned to receive the foremost advancing article at said point but which is supported for pivotal movement of substantially 90° in either direction from its normal position in a plane which includes its axis, electric signal producing detecting and scanning means for determining the presence and endwise orientation of an article in said tube which means comprises a single photo-electric cell unit for detecting the presence of an article wholly within the tube and a pair of photo-electric cell units for discriminating between the shapes of the ends of the article, actuating means responsive to said detecting and scanning means for pivoting said tube from its normal position selectively in one or the opposite direction depending upon the endwise orientation of the article, means for ejecting the article from the tube in one direction when the tube is pivoted 90° from its normal position, and signal producing photo-electric cell means for determining the discharge of an article from the tube and for thereupon causing said actuating means to return the tube to its normal position.

3. Apparatus for sequentially arranging each of a plurality of articles in the same endwise direction at a point in the advance of the articles in an end-to-end row, said apparatus comprising a tube which is normally positioned to receive the foremost advancing article at said point but which is supported for pivotal movement of substantially 90° in either direction from its normal position in a plane which includes its axis, detecting and scanning means for determining the presence and endwise orientation of an article in said tube, actuating means responsive to said detecting and scanning means for pivoting said tube in one or the opposite direction depending upon the endwise orientation of the article, said actuating means including a reciprocable rack and a pair of fluid motors connected therewith so that one fluid motor drives the rack in one direction as the result of the foremost article entering the tube with one end forward and the other fluid motor drives the rack in the opposite direction when the foremost article enters the tube with the other end forward, means for ejecting the article from the tube in one direction when the tube is pivoted 90° from its normal position, and means for determining that the article has been ejected and for then operating said one or other fluid motor to return said rack and tube to their original positions.

4. Apparatus for sequentially arranging each of a plurality of articles in the same endwise direction at a point in the advance of the articles in an end-to-end row, said apparatus comprising a tube which is normally positioned to receive the foremost advancing article at said point but which is supported for pivotal movement of substantially 90° in either direction from its normal position in a plane which includes its axis, detecting and scanning means for determining the presence and endwise orientation of an article in said tube, actuating means responsive to said detecting and scanning means for pivoting said tube in one or the opposite direction depending upon the endwise orientation of the article, said actuating means including a reciprocable rack for pivoting the tube, a cross head pivotally connected to said rack, a pair of fluid motors pivotally connected to the ends of the cross head and normally retaining the rack in a position corresponding to the normal position of the tube, one fluid motor being operable to drive the rack and pivot the tube in one direction as the result of an article entering the tube with one end forward and the other fluid motor being operable to drive the rack and pivot the tube in the opposite direction as the result of an article entering the tube with the other end forward, means for ejecting the article from the tube in one direction when the tube is pivoted 90° from its normal position, and means for determining that the article has been ejected and for then operating said one or other fluid motor to return said rack and tube to their original positions.

5. Apparatus for sequentially arranging each of a plurality of articles in the same endwise direction at a point in the advance of the articles in an end-to-end row, said apparatus comprising a tube which is normally positioned to receive the foremost advancing article at said point but which is supported for pivotal movement of substantially 90° in either direction from its normal position in a plane which includes its axis, electric signal producing detecting and scanning means for determining the presence and endwise orientation of an article in said tube which means comprises a single photo-electric cell unit for detecting the presence of an article wholly within the tube and a pair of photo-electric cell units for discriminating between the shapes of the ends of the article, actuating means responsive to said detecting and scanning means for pivoting said tube from its normal position selectively in one or the opposite direction, said actuating means including a reciprocable rack and a pair of fluid motors connected therewith so that one fluid motor will move the rack and pivot the tube in one direction as a result of the article entering the tube one end first and so that the other fluid motor will move the rack and pivot the tube in the opposite direction as a result of the article entering the tube with the other end first, means for ejecting the article from the tube in one direction when the tube is pivoted 90° from its normal position, and signal producing photo-electric cell means for determining the discharge of an article from the tube and for thereupon causing said actuating means to return the tube to its normal position.

6. Apparatus for sequentially arranging each of a plurality of articles in the same endwise direction at a point in the advance of the articles in an end-to-end row, said apparatus comprising a tube which is normally positioned to receive the foremost advancing article at said point but which is supported for pivotal movement of substantially 90° in either direction from its normal position in a plane which includes its axis, detecting and scanning means for determining the presence and endwise orientation of an article in said tube, actuating means responsive to said detecting and scanning means for pivoting said tube from its normal position in one or the opposite direction depending upon the endwise orientation of the article, means for ejecting the article from the tube in one direction when the tube is pivoted 90° from its normal position, said actuating means being operative upon discharge of an article to return the tube to its normal position, and means for feeding each article to the tube in timed relationship to permit the aforesaid tube operation, said feeding means comprising a driven endless belt engaging and advancing the articles at a relatively slow speed to a point distant from said tube, and a pair of driven rollers arranged to engage the opposite sides of the foremost article at said distant point and to thrust it into the tube at a much higher speed.

7. In apparatus for unscrambling articles such as plastic bottles and then advancing them sequentially in the same endwise orientation, the combination comprising a hopper for receiving a supply of the articles in random fashion, a rotating bottom in said hopper having a marginal portion sufficient in size to accommodate only the transverse dimension of the articles and arranged to move articles thereon from the hopper in a generally tangential path, driven means within said hopper and engaging articles therein over said marginal portion to prevent articles being moved from the hopper as said above except in an end-to-end row, means for advancing the row of articles comprising a driven endless belt engaging and advancing them at a relatively slow speed to a point, a pair of driven rollers engaging the opposite sides of each article reaching said point to thrust it forwardly at a much higher speed, a tube normally positioned to receive the foremost article advancing from the rollers and which tube is supported for pivotal movement of substantially 90° in either direction from its normal position in a plane which includes its axis, detecting and scanning means for determining the presence and endwise orientation of an article in said tube, actuating means responsive to said detecting and scanning means for pivoting said tube from its normal position in one or the opposite direction depending upon the endwise orientation of the article, and means for ejecting the article from the tube in one direction when the tube is pivoted 90° from its normal position, said actuating means being operable upon ejection of an article to return the tube to its normal position.

References Cited in the file of this patent
UNITED STATES PATENTS

| | | |
|---|---|---|
| 2,836,324 | Willis | May 27, 1958 |
| 3,015,413 | Hengel | Jan. 2, 1962 |